3,088,880
6-AMINOPENICILLANIC ACID AMIDE
PRODUCTION
Hsing T. Huang, Groton, Conn., assignor to Chas. Pfizer & Co., Inc., New York, N.Y., a corporation of Delaware
No Drawing. Filed Apr. 10, 1961, Ser. No. 101,683
7 Claims. (Cl. 195—36)

This invention is concerned with the production of 6-aminopenicillanic acid amides by microbiological means. In particular, it is concerned with the hydrolysis of penicillin amides by means of microorganisms, or hydrolyzing enzymes elaborated by these microorganisms, to produce 6-aminopenicillanic acid amides.

It is known to produce 6-aminopenicillanic acid, the valuable intermediate which may be regarded as the parent compound of the various penicillins which differ only in the acyl substituent on the 6-amino group, microbiologically by fermentation of a penicillin producing mold in a suitable nutrient medium particularly in the absence of a side chain precursor and by enzymatic hydrolysis of penicillins. Evidence for the enzymatic hydrolysis of a penicillin was cited by Sakaguchi et al., J. Agr. Chem. Soc. Japan, 23, 411 (1950), who claim to have found a new enzyme, which they termed "penicillin-amidase," in the mycelium of *Penicillium chrysogenum* Q 176 which cleaves N-benzyl-penicillin (penicillin G) into 6-aminopenicillanic acid and phenylacetic acid.

The term "penicillin" is used to describe a group of acyl derivatives of 6-aminopenicillanic acid, both chemically and biochemically produced, having the general formula:

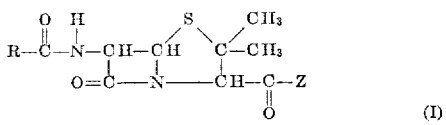

(I)

wherein R is selected from the group consisting of saturated and unsaturated alkyl, aryl, aralkyl, heterocyclic, alicyclic and substituted derivatives thereof; Z is OM wherein M is selected from the group consisting of hydrogen and alkali metal.

It has now been found possible to hydrolyze certain penicillin amides, that is, compounds of Formula I wherein Z represents the moiety

with the hydrolyzing or enzyme activity of selected strains of microorganisms, e.g., bacteria of the class Schizomycetes, to produce the corresponding amides of 6-aminopenicillanic acid. This hydrolyzing or enzyme activity is referred to herein as "penicillin-acylase" activity since it resuluts in elimination of the acyl

moiety from the substrate.

The 6-aminopenicillanic acid amides thus produced are highly valuable as intermediates for the synthesis of new and heretofore unavailable penicillin amides and of penicillin amides difficult or costly to obtain by presently known methods. They offer a convientient route to amides of those penicillins which contain a reactive group in the side-chain, or which react poorly via the methods of amide formation heretofore available, or which are prepared from costly and not readily available side-chain precursors. The one step reaction now possible by the acylation of 6-aminopenicillanic acid amides is, in many instances, the most convenient and economical route available to the amides of penicillins many of which demonstrate enhanced activity against the antibiotic resistant Staphylococci relative to that demonstrated by the penicillins themselves.

The amides of a large variety of structurally different penicillins, both chemically and biochemically produced, are operative in the process of this invention. Of particular value in the process of this invention from an economic standpoint, based on their availability, ease of hydrolysis and substantial conversion to the corresponding amide of 6-aminopenicillanic acid, are the amides of the so-called "natural" penicillins, that is, those produced by fermentation methods. The amides of the following penicillins are especially desirable in this process: benzylpenicillin, phenoxymethylpenicillin, phenylmercaptomethylpenicillin, allylmercaptomethylpenicillin, n-heptylpenicillin, p-hydroxybenzylpenicillin, p-methylpenicillin, 2-pentenylpenicillin, n-amylpenicillin and 3-pentenylpenicillin.

A variety of microorganisms have been found to be penicillin-acylase producers. The strains of microorganism are selected by testing their ability to hydrolyze benzylpenicillin amide. Although the amides of any of the above penicillins can be used as substrate in the test procedure, benzylpenicillin amide is specifically mentioned because of its ready availability. Its utilization as substrate in this process is based only on economic reasons and if, in the future, an amide of some other penicillin becomes as readily or more readily available as a result of constant developments in the field, it would undoubtedly serve to displace benzylpenicillin amide from its preferred position.

Preliminary testing of microorganisms for penicillin-acylase activity can be carried out by a number of methods to determine whether or not penicillin-acylase activity is present and the approximate relative value of this activity. Since 6-aminopenicillanic acid amide possesses a much lower order of antibacterial activity than does benzylpenicillin amide, a decrease in potency of the fermentation liquor as determined by microbiological assay is indicative of penicillin-acylase activity. However, since other factors may operate to destroy benzylpenicillin amide activity, this test is not conclusive. In another modification, which is satisfactory as a screening test, the 6-aminopenicillanic acid amide on paper chromatograms is detected by conversion to benzylpenicillin amide followed by plating on agar seeded with *Bacillus subtilis*. The preferred test method involves removal of the benzylpenicillin amide by solvent extraction, at low pH, of the fermentation liquor followed by the running of duplicate paper chromatograms of the fermentation liquor in the system toluene:acetone:calcium acetate, 2% aqueous solution (2:9:1) treated with phenylacetyl chloride in the presence of a buffer at pH of about 6–9. The remaining paper chromatogram serves as a blank. Both paper chromatograms are then assayed microbiologically by pressing on agar plates seeded with *B. subtilis*.

More specifically, a useful test method for selecting a penicillin-acylase producing strain of microorganism comprises diluting a culture of the microorganism under investigation followed by plating out on a suitable solid nutrient medium and incubation to produce a considerable number of single cell colonies. Individual colonies are then transferred to slants. Each isolate is grown in a suitable medium under submerged conditions in shake flasks. When good growth is obtained, the pH of the culture is adjusted to 7.0 to 8.0, if necessary. Benzylpenicillin amide at a level of 1 to 5 mg./ml. is added and the mixture is shaken in the presence of 1% toluene for from 2–20 hours. The cells are then removed, the clarified broth acidified to a pH value of from about 3 to about 5 with a mineral acid, such as sulfuric acid, and then extracted with a water immiscible organic solvent to remove benzylpenicillin amide. Any water immiscible solvent is suitable as extracting solvent. However, several water immiscible organic solvents are better than others for reasons of economics and higher solubility of the benzylpenicillin amide therein. Among these are methylisobutylketone, butyl acetate, diethylether, butanol and chloroform. The extracted broth is then adjusted to about 7 to 9, buffered at this level with, for example, sodium bicarbonate or disodium hydrogen phosphate, and then treated with an excess of an acylating agent, preferably phenylacetyl chloride for periods of from about 10 minutes to about 2 hours at a temperature of from about 0° C. to about 50° C. The benzylpenicillin amide thus produced is then identified and assayed in accordance with standard practice. The assay value obtained provides a relative measure of the penicillin-acylase producing capacity of a given organism in terms of benzylpenicillin amide units.

The preferred method involves the use of freeze-dried cells of the test microorganism rather than the whole broth or the mycelium as the penicillin-acylase source, growing said freeze-dried cells in a suitable medium and adding the benzylpenicillin amide substrate under the above mentioned conditions.

The effectiveness of the pencillin-acylase producing microorganism for the process of this invention may be determined by cultivating the organism in a suitable nutrient medium containing a carbohydrate source such as sugars, starch and glycerol, an organic nitrogen source such as soy bean meal, cotton seed meal, peanut meal, hydrolyzed casein and cornsteep liquor, and mineral salts such as sodium chloride, sodium nitrate, magnesium sulfate and potassium phosphate. In addition to these, a buffering agent, such as calcium carbonate or potassium dihydrogen phosphate, and a foam preventer such as vegetable oils or animal oils may be used. The organism is best grown under submerged conditions of agitation and aeration at temperature ranging from about 0° to about 50° C. Temperatures of from about 20° to about 40° C. are preferred with the range of 26° to 30° C. representing the most desirable operating temperature under most circumstances.

The preferred pH range for the growth of the culture is from 6 to 8 although the range of 5 to 9 is operative. During the growth phase, the medium is agitated with stirrers of suitable design for incorporating air into the broth. Aeration at a rate of from about ½ to 2 volumes of air per volume per minute produces satisfactory results. The penicillin amide compound as a solid or as a solution in a suitable solvent, for example, water, acetone and lower alkanols such as ethanol, and aqueous mixtures thereof, may be added to the cultivated microorganism under sterile conditions and the mixture agitated and aerated in order to bring about hydrolysis of the penicillin amide substrate. The penicillin amide may be added when the medium is seeded under sterile conditions with a culture of the microorganism or after growth of the organism is established, that is, after good growth is achieved.

For any given species of microorganism, it is necessary to select strains which produce penicillin-acylase activity. This invention is not limited to any species of microorganism nor does it include every strain of any given species. On the other hand, every strain of microorganism yet tried, which produces penicillin-acylase, has been found capable of producing adequate conversion rates of penicillin amide substrates and satisfactory yields of 6-aminopenicillanic acid amides. It is to be understood that the present invention embraces the use not only of the herein described organisms, which are given merely for illustrative purposes; but it also embraces the use of mutants produced from the described organisms by means of such as X-ray irradiation, ultraviolet irradiation, treatment with nitrogen mustards and the like. It is to be further understood that the invention includes the use of subcultures obtained by various standard microbiological techniques, such as the single colony and single spore isolation methods. Such mutants and/or subcultures may differ in certain respects from the strains described herein.

The bacteria which include penicillin-acylase producing strains are those belonging to the Schizomycetes, particularly certain strains of species of the genus Proteus, the genus Aerobacter, the genus Escherichia, the genus Pseudomonas, the genus Micrococcus, the genus Nocardia.

The preferred strains of bacteria are selected from the following species, namely: *Pseudomonas solaneolens, Escherichia coli, Aerobacter aerogenes, Proteus rettgeri, Proteus sphingidis, Micrococcus roseus,* and Nocardia sp., strain L.A.V.

The following microorganisms (Table I) are especially effective in the process of this invention:

TABLE I

Schizomycetes:
  *Proteus rettgeri* ATCC 9918
  *Proteus rettgeri* ATCC 9919
  *Proteus rettgeri* ATCC 9250
  *Pseudomonas asplenii* NRRL B733
  *Aerobacter aerogenes* ATCC 13529
  *Escherichia coli* ATCC 9637
  *Nocardia* sp., strain L.A.V. ATCC 13635
  *Pseudomonas solaneolens* NRRL B989
  *Micrococcus roseus* ATCC 416

The choice of culture medium is not a critical factor. Indeed, any of the media commonly used for growing microorganisms of the type given above can be employed. However, it should be pointed out that a medium containing naturally occurring materials is preferred over a purely synthetic media because of better growth and rate of penicillin-acylase production. Certain media, of course, are better suited for a particular microorganism than are others for reasons of faster growth and increased rate of penicillin-acylase production. This is determinable by experiment and is illustrated in the examples which follow.

Such microorganisms produce many enzymes and it is, therefore, surprising and unpredictable that deacylation is the predominant reaction even when using the living microorganisms in place of enzyme preparations produced from them.

A most useful method for the process of this invention is one in which the microorganism is grown on a suitable nutrient medium under aerobic conditions in the absence of the penicillin amide. The cells are then collected by centrifugation or by filtration and may, if desired, be washed with distilled water. They are then freeze dried. The freeze dried cells are suspended in distilled water containing the penicillin amide substrate. The mixture is agitated and maintained at about pH 7 to 8 for a period of from about 12 to 48 hours after which the products of the reaction are recovered. This process has the advantage of ease of recovery of the 6-aminopenicillanic acid amide products, since the various nutrient material originally used to obtain growth of the microorganism is now absent as well as the various material excreted by the growth organism during the initial period. Other methods familiar to enzyme chemists may be utilized for conducting the present hydrolysis process. The proportion of products and the rate of hydrolysis as well as the nature of the by-products formed, will vary depending on the particular reaction conditions employed. It should be pointed out that the hydrolyzing activity or source thereof or enriched enzyme extracts obtained therefrom can be used in this process.

In general, a concentration of not greater than one-tenth to five percent of substrate by volume based on the total volume of culture is used in conducting this process, although sometimes other concentrations may be found to be more favorably used.

The 6-aminopenicillanic acid amide can be recovered from the conversion mixtures by various methods. It can, for example, be recovered by repeated extraction with a suitable water immiscible solvent, such as chloroform, methylethylketone, methylisobutylketone, ethylacetate and n-butanol. An effective procedure involves a first extraction of the conversion mixture with one of the above-mentioned solvents at a pH of from about 2.0 to about 5.0, and preferably at a pH of from about 3.0 to 4.0, in order to remove unconverted penicillin amide. This extraction, especially when performed at the lower pH range given above, also removes at least a part of the penicillin acid formed by cleavage of the amide group. The 6-aminopenicillanic acid amide is then extracted with one of the above water immiscible solvents at pH of from about 7.0 to 9.0 and preferably at a pH of from about 7.5 to 8.5. The extract is dried, and evaporated to dryness to give the 6-aminopenicillanic acid amide. Alternatively, the 6-aminopenicillanic acid amide is isolated in the form of an acid salt, e.g., the hydrochloride, sulfate, acetate, p-toluenesulfonate, propionate, by extraction of the water washed extract containing the amide with an aqueous solution of the acid and freeze-drying of the aqueous extract. When the acid used for salt forming purposes, e.g., p-toluenesulfonic acid is insoluble or difficultly soluble in water, it is added to the amide containing extract in a suitable solvent, that is, one which is miscible with the solvent extract. The acid salt precipitates and is recovered by filtration or centrifugation. Para-toluenesulfonic acid, for example, is conveniently added to the amide extract as an acetone or ether solution.

The penicillin amides used as substrates in the process of this invention are obtained by conversion of the desired penicillin to a simple or mixed anhydride, followed by amidation of the anhydride by ammonia or an amine according to well known procedures. The simple anhydrides, for example, are prepared by reacting the triethylammonium salt of the desired penicillin with thionyl chloride. The mixed anhydrides are readily prepared by treating an alkali metal salt, e.g., the sodium or potassium salt, or the triethylammonium salt of the penicillin of choice with the acid halide, preferably the acid chloride, of the second acid component in a suitable reaction-inert anhydrous solvent, such as chloroform or acetone at from about −10° C. to about 50° C. The anhydrides need not be isolated. It is frequently more convenient and practical to use it in the form of the solution in which it is prepared. The amidation reaction is conducted in a reaction-inert solvent, preferably a non-aqueous solvent, such as chloroform, dimethylacetamide, tetrahydrofuran, dioxane, methylisobutylketone and acetone, at a temperature of from about −10° C. to about 50° C. Ammonia, when used as amidating agent to produce the simple unsubstituted amide, can be used as a solution of ammonia in a non-aqueous solvent. Alternatively, and preferably, it is used in the form of an aqueous alkaline solution of an ammonium salt such as diammonium phosphate. The insoluble amide derivative precipitates from the reaction mixture.

In the specific examples presented below, emphasis has been placed on the utilization of benzylpenicillin amide as substrate for the formation of 6-amino-penicillanic acid amide because of its availability and cost. However, as mentioned above any penicillin amide can serve as substrate. The choice of the particular penicillin amide is determined primarily by economic factors. Thus, it is to be understood that the following examples are given solely for purposes of illustration only and, while indicating preferred embodiments of the invention, are not given by way of limitation, since various changes and modifications within the spirit and scope of the invention will become apparent to those skilled in the art.

*Example I*

An aqueous medium having the following composition is prepared.

| Ingredients: | Grams/liter |
| --- | --- |
| Peanut meal | 15.0 |
| Sodium sulfate | 1.0 |
| Lactose | 10.0 |
| Cerelose (dextrose hydrate) | 10.0 |
| Corn steep liquor | 5.0 |
| Calcium carbonate | 5.0 |
| Yeast extract | 0.2 |
| Adjust to pH 7.0. | |
| Tap water to volume. | |

100 ml. of this nutrient medium in a 300 ml. flask sterilized in the usual way, is inoculated with a slant culture of *Proteus rettgeri* ATCC 9918 and then shaken for 72 hours at 28° C. until good growth is obtained. The pH is then adjusted to 7.0–7.8 with dilute sodium hydroxide, 100 mg. of benzylpenicillin amide, dissolved in acetone and 2 ml. of acetone added and the reaction mixture incubated for 24 hours at 28° C. with shaking. The mixture is periodically assayed for 6-aminopenicillanic acid amide by paper chromatography using the system toluene:acetone:calcium acetate, 2% aqueous solution (2:9:1). The benzylpenicillin amide substrate and the 6-aminopenicillanic acid amide move with $R_f$ values of 0.9 and 0.7, respectively. Spraying of the 6-aminopenicillanic acid spot with 1% sodium bicarbonate followed by 0.2% phenylacetyl chloride in acetone yields benzylpenicillin amide. The benzylpenicillin amide thus prepared produces a characteristic zone of inhibition at the origin when the paper chromatogram is bioautographed on an agar plate seeded with *B. subtilis*.

The 6-aminopenicillanic acid amide is isolated, following filtration and chloroform extraction of unconverted benzylpenicillin amide at pH 3.5, by repeated chloroform extraction of the broth at pH 7.5. Water wash of the chloroform extract followed by drying over anhydrous sodium sulfate and evaporation to dryness gives the amide of 6-aminopenicillanic acid.

*Example II*

The procedure of Example I is repeated using the following medium.

| Ingredients: | Grams/liter |
| --- | --- |
| Potassium phosphate, dibasic | 7.0 |
| Potassium phosphate, monobasic | 3.0 |
| Sodium citrate | 0.4 |
| Magnesium sulfate heptahydrate | 0.1 |
| Ammonium sulfate | 1.0 |
| NZ amine | 10.0 |
| Yeast extract | 0.5 |
| Adjust to pH 7.0. | |
| Tap water to volume. | |

The 6-aminopenicillanic acid amide recovered is identical to that obtained in Example I.

Repetition of this procedure but substituting benzylpenicillin amide by the simple amides of the following penicillins produces 6-aminopenicillanic acid amide: phenoxymethyl-, phenylmercaptomethyl-, allylmercaptomethyl-, n-heptyl-, n-amyl-, 2-propenyl-, 2-pentenyl-, 3-pentenyl-, p-hydroxybenzyl- and p-methylbenzylpenicillin.

*Example III*

Freeze-dried cells of *Proteus rettgeri* ATCC 9250, grown in the medium of Example II are resuspended in a volume of water equal to that of the original medium. Benzylpenicillin amide in acetone solution (sufficient benzylpenicillin amide is added to give a final concentration of 1 g./l. in the medium) and 2% by volume of toluene are added and the mixture shaken and incubated at 28° C. and pH 7.0 to 8.0 until the periodic assays showed good conversion to 6-amino-penicillanic acid amide. The conversion mixture is worked up as in Example I.

Repetition of this procedure, but substituting *Proteus rettgeri* ATCC 9250 freeze-dried cells by freeze-dried cells of the microorganisms of Table I produces 6-aminopenicillanic acid amide in each instance.

Example IV

Following the procedure of Example I, 6-aminopenicillanic acid amide is prepared by the replacement of *Proteus rettgeri* ATCC 9918, by the following organisms:

*Proteus rettgeri* 9919
*Proteus rettgeri* 9250
*Escherichia coli* ATCC 9637
*Aerobacter aerogenes* ATCC 13529
Nocardia sp., L.A.V. ATCC 13635
*Pseudomonas asplenii* NRRL B733
*Pseudomonas solaneolens* NRRL B989
*Proteus sphingidis* ATCC 6911
*Micrococcus roseus* ATCC 516

Example V

Freeze dried cells of Nocardia sp., strain L.A.V. ATCC 13635, grown in a sterile aqueous medium of the following composition,

| Ingredient: | Grams/Liter |
|---|---|
| Corn steep liquor | 20.0 |
| Crude molasses B | 20.0 |
| Crude glycerol | 10.0 |
| Magnesium phosphate | 10.0 |
| Magnesium sulfate heytahydrate | 1.0 |

Adjust to pH 7.5 with dilute potassium hydroxide.
Tap water to volume.

are suspended in a volume of water equal to that of the original medium. Phenoxymethylpenicillin amide in acetone solution (sufficient to give a substrate concentration of 1 g./l. in the fermentation medium) and 2% by volume of toluene are added. The mixture is shaken and incubated at 28° C. and pH 7.0 to 8.0 until good conversion to 6-aminopenicillanic acid amide is obtained. The broth is then filtered and worked up according to the procedure of Example I to give 6-aminopenicillanic acid amide.

Following the above procedure the following penicillin amides are deacylated to 6-aminopenicillanic acid amide by freeze-dried cells of the micro-organisms listed. For convenience only the R group of the penicillin amide is listed.

| Microorganism | Penicillin Amide Substrate R |
|---|---|
| *Proteus rettgeri* ATCC 9250 | benzyl. |
| *Proteus rettgeri* ATCC 9918 | benzyl. |
| *Proteus sphingidis* ATCC 6911 | n-heptyl. |
| *Escherichia coli* ATCC 9637 | benzyl. |
| *Escherichia coli* ATCC 9637 | phenoxymethyl. |
| *Proteus rettgeri* ATCC 9250 | 2-pentenyl. |
| *Proteus rettgeri* ATCC 9919 | 3-pentenyl. |
| *Proteus rettgeri* ATCC 9250 | phenoxymethyl. |
| Nocardia sp., strain L.A.V. ATCC 13635 | phenoxymethyl. |
| *Micrococcus roseus* ATCC 416 | phenoxymethyl. |

Example VI

The procedure of Example I is repeated using the microorganisms of Table I and the following simple penicillin amides as substrates: phenoxymethyl-, phenylmercaptomethyl-, allylmercaptomethyl-, n-heptyl-, n-amyl-, 2-propenyl-, 2-pentenyl-, 3-pentenyl-, p-hydroxybenzyl- and p-methylbenzylpenicillin. 6-aminopenicillanic acid amide is produced in each instance as indicated by the paper chromatograms.

It is apparent from the examples given that the amides of many penicillins and many strains of microorganisms may be used in the process of this invention. Moreover, amides, both simple and substituted amides, of many of the new penicillins currently being developed will be found operative as substrates in this process. A comprehensive listing of penicillin amides or a cataloging of useful strains of microorganisms is not possible. The genera of microorganisms exemplified are widely distributed and other genera, for example, the strains of microorganisms of other genera cited in "Bergey's Manual of Determinative Bacteriology," 7th Edition, pages xiii to xviii, will be found operative in the process of this invention.

What is claimed is:

1. A process for producing 6-aminopenicillanic acid amide which comprises reacting a penicillin amide having the formula

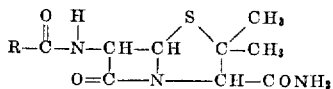

wherein R is selected from the group consisting of benzyl, phenoxymethyl, phenylmercaptomethyl, allylmercaptomethyl, n-heptyl, p-hydroxybenzyl, p-methylbenzyl, n-amyl, 2-pentenyl and 3-pentenyl with the hydrolyzing activity of a penicillin-acylase producing microorganism selected from the group consisting of *Proteus rettgeri*, *Proteus sphingidis*, *Aerobacter aerogenes*, *Escherichia coli*, *Pseudomonas asplenii*, *Pseudomonas solaneolens*, *Micrococcus roseus*, and Nocardia sp. L.A.V.

2. The process of claim 1 wherein freeze-dried cells of the penicillinacylase producing microorganism are used.

3. The process of claim 1 wherein an aqueous penicillin amide containing nutrient medium is fermented under submerged aerobic conditions.

4. The process of claim 1 wherein the organism is Nocardia sp. L.A.V., its mycelium is first separated from the broth and the penicillin-amide then contacted with an aqueous suspension of the mycelium.

5. The process of claim 1 wherein the penicillin amide is contacted with a growing culture of a penicillin acylase producing strain of microorganism.

6. The process of claim 3 wherein R is benzyl and the microorganism is *Proteus rettgeri* ATCC 9250.

7. The process of claim 2 wherein R is benzyl and the microorganism is *Escherichia coli* ATCC 9637.

References Cited in the file of this patent

UNITED STATES PATENTS 2,941,995     Doyle et al.     June 21, 1960

FOREIGN PATENTS 569,728     Belgium     Nov. 15, 1958

UNITED STATES PATENT OFFICE
CERTIFICATE OF CORRECTION

Patent No. 3,088,880              May 7, 1963

Hsing T. Huang

It is hereby certified that error appears in the above numbered patent requiring correction and that the said Letters Patent should read as corrected below.

Column 8, line 54, for the claim reference numeral "3" read -- 2 --.

Signed and sealed this 3rd day of December 1963.

(SEAL)
Attest:

ERNEST W. SWIDER

Attesting Officer

EDWIN L. REYNOLDS

Acting Commissioner of Patents